Nov. 15, 1960 J. HANDLEY 2,960,163

HIGH SPEED PERFORATORS FOR RECORDING INFORMATION

Filed May 4, 1956 4 Sheets-Sheet 1

Inventor
J. HANDLEY
By R. F. Morris
Attorney

Nov. 15, 1960 J. HANDLEY 2,960,163

HIGH SPEED PERFORATORS FOR RECORDING INFORMATION

Filed May 4, 1956 4 Sheets-Sheet 2

Inventor

J. HANDLEY

By [signature]

Attorney

Nov. 15, 1960 J. HANDLEY 2,960,163

HIGH SPEED PERFORATORS FOR RECORDING INFORMATION

Filed May 4, 1956 4 Sheets-Sheet 3

Inventor

J. HANDLEY

By [signature]

Attorney

Nov. 15, 1960 J. HANDLEY 2,960,163

HIGH SPEED PERFORATORS FOR RECORDING INFORMATION

Filed May 4, 1956 4 Sheets-Sheet 4

Inventor
J. HANDLEY
By [signature]
Attorney

United States Patent Office 2,960,163
Patented Nov. 15, 1960

2,960,163

HIGH SPEED PERFORATORS FOR RECORDING INFORMATION

John Handley, Little Marland, Briar Hill, Purley, England

Filed May 4, 1956, Ser. No. 582,718
Claims priority, application Great Britain May 5, 1955
5 Claims. (Cl. 234–119)

The present invention relates to perforating apparatus for perforating the elements of a signal combination.

When information stored in a computer is to be put into a tangible form as combinations of perforations on a tape, it can be supplied from the computer at very high speeds. Known perforating apparatus is, by comparison, very slow moving and valuable computer time is thus wasted in the perforating operation.

It is an object of the present invention to reduce considerably the perforating time by providing perforating apparatus capable of much higher speeds of working. This is done by reducing the time taken for the selection of the particular punches to be operated. With the perforating apparatus according to the present invention it is expected that the speed of perforating will be raised at least to the order of 2,500 words per minute.

According to the present invention there is provided perforating apparatus for perforating the elements of a signal combination, comprising, for each element, a relay, a spring-held lever holding the armature of said relay in the position last assumed thereby, cam means for moving said lever in a direction against the tension of said spring to release said armature to take up a new position, and means for selectively operating a perforating punch, during the motion of said lever in the opposite direction, according to the new position assumed by said armature.

The invention will now be described in detail with reference to the accompanying drawings in which, Figure 1 is a side elevation of a reperforator according to the present invention.

Figure 1:
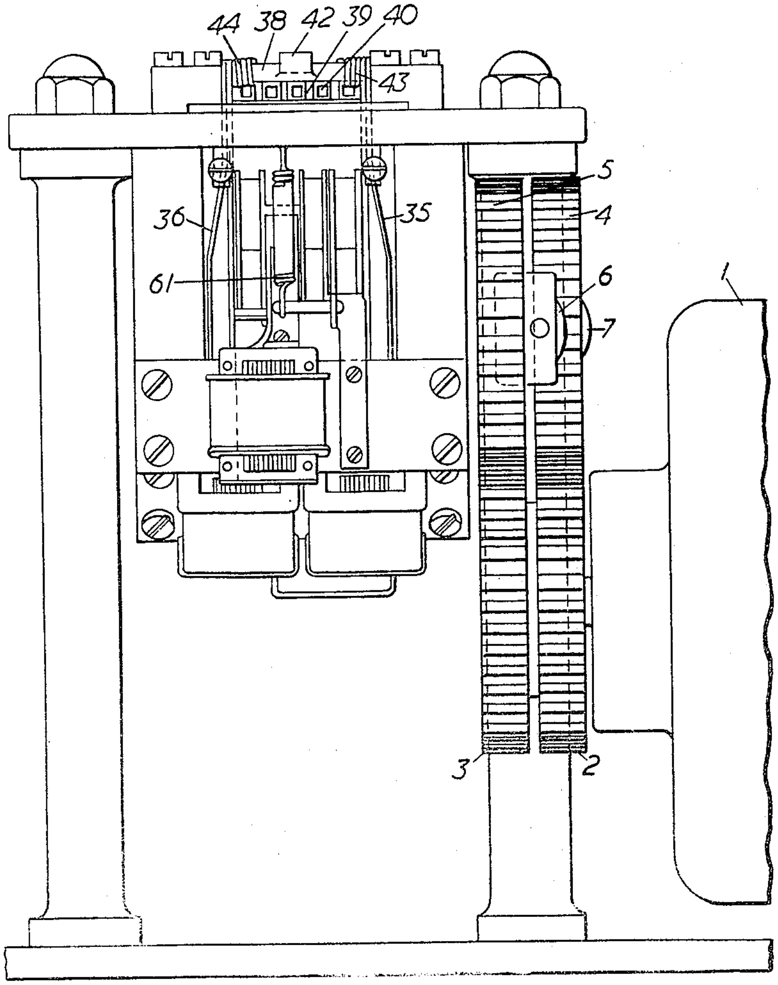
Figure 2:
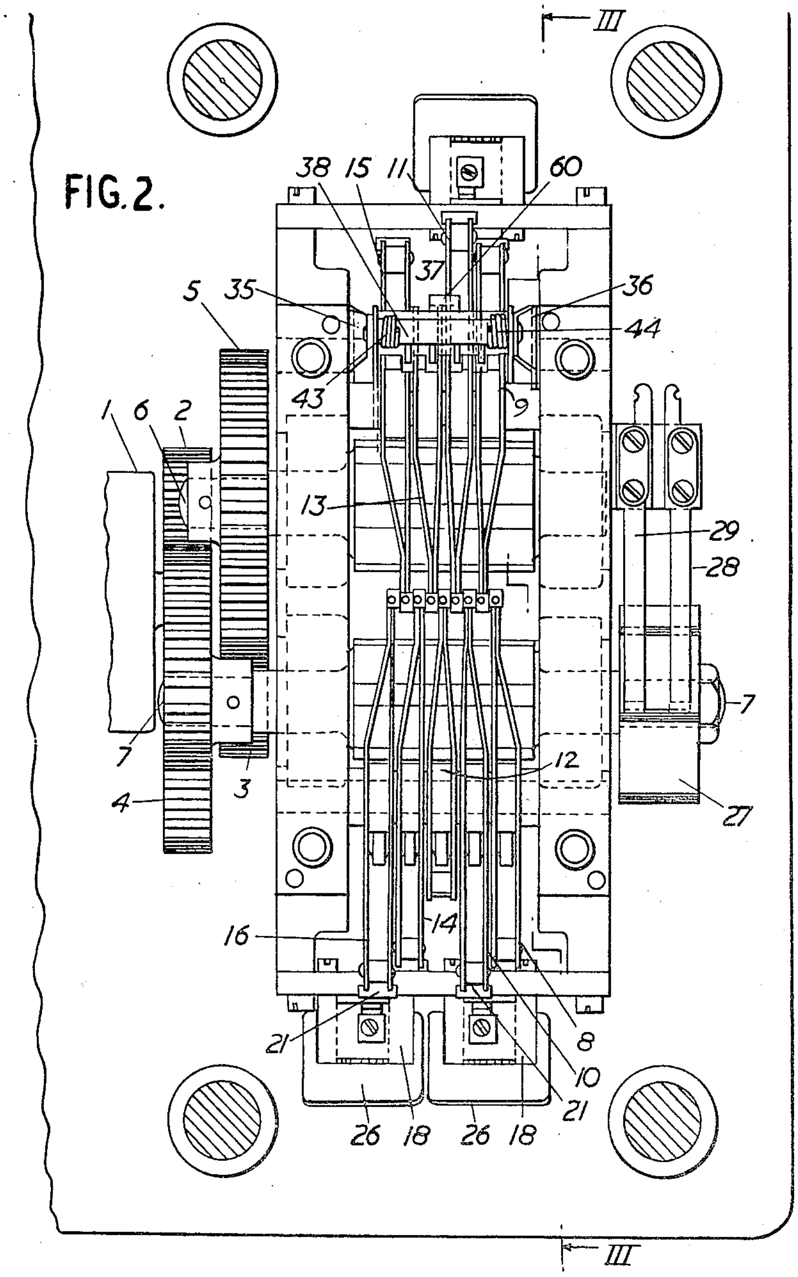
Figure 2 is a plan view of the reperforator of Figure 1 with the top plate removed.
Figure 3:
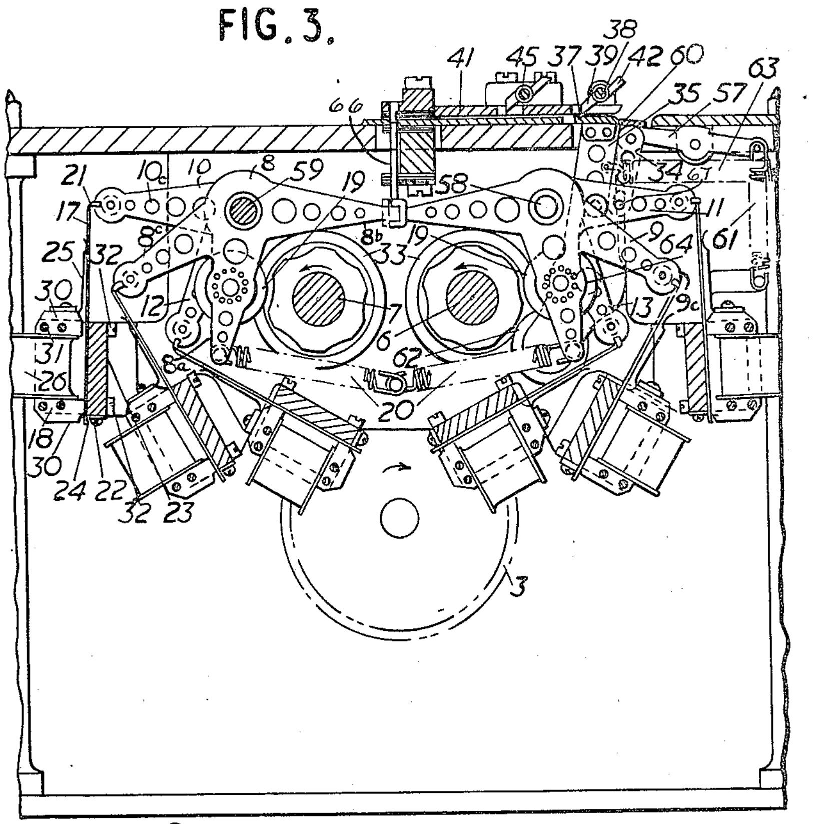
Figure 3 is a sectional elevation of the reperforator of Figures 1 and 2 taken along the line III—III of Figure 2.

Referring first to Figures 1 to 3 the drive for the reperforator is supplied by a motor 1 (Figures 1 and 2) through spur gears 2 and 3 which engage respectively gears 4 and 5 on cam shafts 6 and 7 (Figures 1 to 3). The cam shafts 6 and 7, which rotate in ball races 33 (Figure 3), carry respectively six and five cams, each cam having six lobes. These cams engage with cam-follower rollers 19 (Figure 3) on one arm of each of the levers 8, 9, 10, 11, 12, 13, 14, 15 and 16 (Figures 2 and 3) and with rollers 62 on feed rockers 35 and 36 as will be described later. The reperforator shown is for perforating a tape with information supplied from a computer in the form of an 8 element code in which the signals for each element are supplied simultaneously. It will, however, be obvious to anyone skilled in the art that the reperforator may be adapted for use with codes of any number of elements received either simultaneously or sequentially. In the embodiment shown levers 8 to 10 and 12 to 16 are the eight element levers and lever 11 is the feed hole lever which is operated every time a combination is perforated.

Each of the levers 8 to 16 has three arms, 8*a*, 8*b*, 8*c* . . . 16*a*, 16*b* and 16*c*; the *a* arm of which carries the roller 19 (Figure 3) and is spring-urged by a spring 20 towards a cam on one or other of the cam sleeves 6 and 7, the *b* or second arm of which actually operates the punch 66 associated with the particular lever and the *c* or third arm of which is controlled by the armature 17 of a relay 18 to determine whether the particular lever and its associated punch are operated or not.

The operation of each of the levers is similar and so will be described with reference to only one of them—lever 10. A projection 21 of hardened metal is provided on the end of the lever 10 and its underside engages the top portion of hardened metal on armature 17. The base of each armature 17 is fixed in a control plate 24 which is clamped to a supporting bar 23 by two screws 22. The plate 24 is separate from the lower end cap 30 of the core of relay 18 as well as from the supporting bar 23. The position of the armature 17 relative to the relay 18 and the projection 21 on the arm 10 may then be adjusted by inserting shims between the plate 24 and the supporting bar 23.

This adjustment of armature 17 is made such that, when a lobe of a cam on cam shaft 7 engages the roller 19 associated with lever 10, the lever 10 is thereby caused to pivot clockwise about its pivot 59 and the projection 21 is lifted free of the end of the armature 17 and the clearance between the projection 21 and the end of the armature 17 is sufficient to enable the armature 17 to be immediately withdrawn, in the event that the relay 18 is energised, without any friction therebetween. If however, the relay remains unenergized, the top of armature 17 will act as a stop against projection 21 and thus prevent the lever 10 from pivoting counterclockwise under urging of spring 20 as a cam valley is presented to roller 19 and thereby also preventing the punch 66 from being urged upwards.

The armature 17 is thus held in position by spring 20 which holds projection 21 against the end of the armature 17, until the lobe of a cam on cam shaft 7 lifts projection 21 clear. If the relay 18 was de-energised for the previous character, the projection 21 holds the armature in the position shown, while if the relay 18 was energised for the previous character the armature 17 is held in the energised position by the tip end of the projection 21 which abuts against a side of armature 17 adjacent its top.

The signals for a character are supplied through commutator 27 (Figure 2) and brushes 28 and 29 a short period (about one and a half milliseconds is suitable) before the rollers 19 are raised by the lobes of the cams on cam shafts 6 and 7. This allows relay 18, which is energised for the character to be perforated, to build up its flux before being released from its spring-held engagement with lever 10 through projection 21. Also the flux of a relay 18 which was energised for the previous character and is not energised for the next one, has time to completely decay before its armature is released by lever 10 thus enabling its spring 25 to exert maximum force against the armature after lever 10 is withdrawn from abutment against the side of the armature.

The relay 18, the armature 17 of which controls lever 10, is energised through coil 26 which surrounds the laminated core of the relay. The core is clamped to the end caps 30 by grub screws 31 and is held to the supporting bar 23 by screw 32. When the relay 18 is energised, the armature 17 moves against the action of spring 25 to close the magnetic circuit and is returned by spring 25 to the position shown in Figure 3 when the relay 18 is de-energised and the projection 21 is raised by the next lobe on cam shaft 7.

As already explained the projection 21 on the lever 10 is freed from its spring-held engagement with the armature 17 when the roller 19 is raised by a lobe on a cam of cam shaft 7, and the armature 17 is allowed to move if the relay 18 has been energised. The lever 10 is then under the control of the cam sleeve 7, its roller 19 being made to follow the contour of a cam on the cam sleeve 7 by spring 20. The contour of the cam is preferably shaped so that the punch 66 operated by the rocker is travelling at maximum velocity when it pierces the paper.

In the embodiment shown the cams on cam-shaft 7 have six lobes or humps. A multi-humped cam of this nature can therefore perforate six characters during each revolution of the cam shaft.

The tape which is being perforated is fed along immediately beneath guide plate 41 past the punches 66 (in a direction from right to left as seen in Figure 3) by the feed pawl 38 (Figures 1, 2, 3) on which there are four teeth 39 (Figure 3). The feed pawl 38 which is supported by two feed rockers 35 and 36 (Figures 1, 2, 3) carries springs 43 and 44 which constantly urge the teeth 39 downwards into contact with the paper. The feed rockers 35 and 36 are pivoted at 64 (Figure 3) and tend to make a clockwise rotation about the point 64 under the action of springs 63. Rollers 62 carried by the feed rockers 35 and 36 are thus urged into contact with cams on cam shaft 6 when the feed rockers 35 and 36 are free to move under the action of springs 63. However the feed rockers 35, 36 are tied together by a pressure plate 37 which is arranged in such a position that it engages with the plate 60 mounted on feed release rocker 57 and movement of feed rockers 35, 36 is prevented when the feed release rocker 57 and plate 60 are in the normal rest position which is that shown in Figure 3.

Every time a combination is perforated the feed lever 11 is released from the control of its relay to move under control of cam shaft 6 in a similar manner to that described for lever 10. As lever 11 moves downward, pin 67 on it pulls the link 34 downwards causing rocker 57 to pivot against the action of spring 61. This pivoting of rocker 57 moves the plate 60 out of engagement with pressure plate 37, so that feed rockers 35 and 36 are free to move under the control of springs 63, rollers 62 and cam sleeve 6. The relative angular positions of rollers 19 and 62 with respect to the cam sleeve 6 are such that the movement of the feed rockers 35 and 36 occurs after the movement of the punch levers 8 to 10 and 12 to 16.

As feed rockers 35 and 36 move, the teeth 39 are pulled backwards (i.e. to the right in Figure 3) over the surface of the paper, any slipping backwards of the paper during this movement being prevented by teeth on pawl 45, and then pushed forward again. During the forward movement of the feed rockers 35 and 36, the teeth 39 which are urged downwards by springs 43 and 44 grip the paper and feed it forward. Teeth 40 (Figure 1) are provided on guide plate 41 between the teeth 39 and these prevent the paper wrinkling up in front of teeth 39. As the feed rockers 35 and 36 complete their forward movement, plate 60 on feed release rocker 57 is moved upwards into position behind pressure plate 37 and prevents movement of feed rockers 35 and 36 until another combination is perforated.

Lug 42 (Figures 1 and 3) is provided on the opposite side of feed pawl 38 to the teeth 39 and maintains the centre of gravity of the pawl 38 on the centre of its bearing so that the operating movement does not affect the pressure with which teeth 39 grip the paper.

Figure 5:
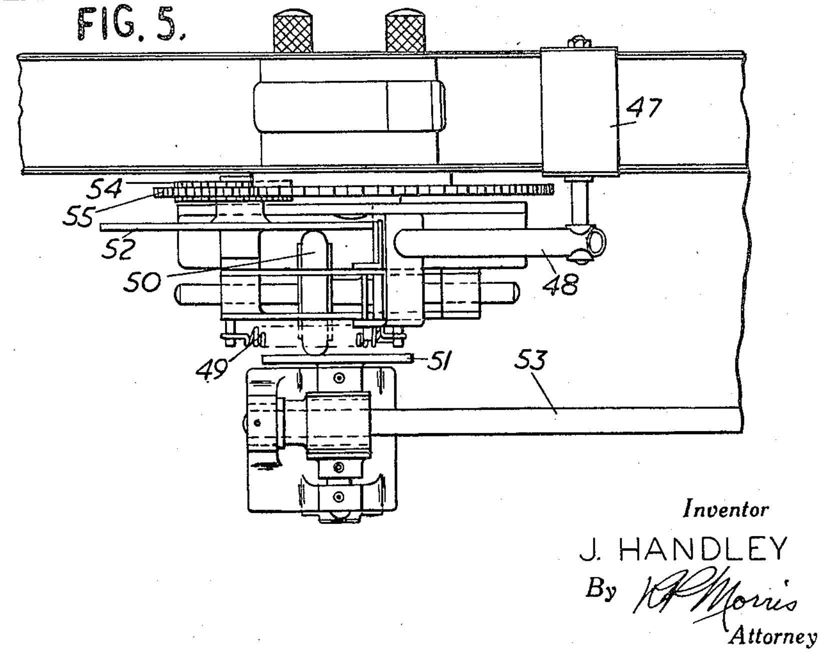
Figure 4 is a side elevation of a servo drive for the paper spool associated with the reperforator of Figures 1 to 3 and Figure 5 is a plan view of the spool and servo drive shown in Figure 4.
Figure 4:
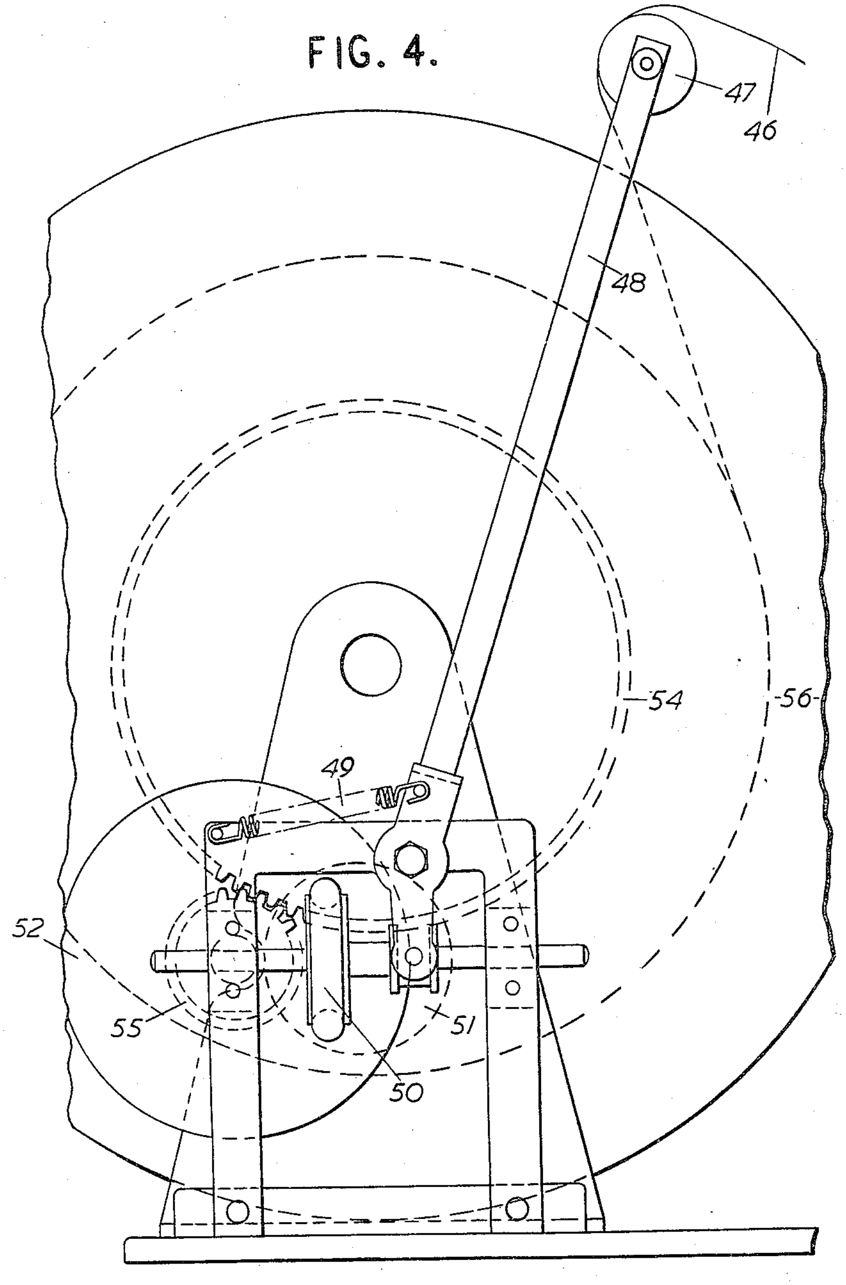

In Figures 4 and 5 there is shown a servo drive for the paper spool associated with the reperforator of Figures 1 to 3. The paper 46 which is being fed to the reperforator passes over a light pulley 47 supported on a tubular arm 48. When the paper is fed forward by teeth 39 (Figures 1 and 3) as already described, the tension in the paper moves the arm 48 against the action of spring 49 to the position shown in Figures 4 and 5. This movement of arm 48 causes idler wheel 50, which in the rest position is in contact with the centre of a disc 51 which is kept constantly rotating by shaft 53, to move to one side of the centre of this disc 51. In this position the idler wheel 50 is driven by disc 51 and in turn drives disc 52 which in turn rotates the spool 56 through gears 54 and 55. As the spool 56 rotates, the tension in the paper 46 relaxes spring 49 pivots arm 48 counter-clockwise and arm 48 moves idler wheel 50 back into the centre of disc 51, in which position it is not rotated by the disc 51.

If the spool 56 over-runs, the tension in the paper 46 is reduced to such an extent that spring 49 will move arm 48 and idler 50 to a position on the opposite side of the centre of disc 51 to that shown in Figures 4 and 5. Idler wheel 50 is then driven in the reverse direction by disc 51 and the spool 56 will take up the excess of paper 46 supplied until idler wheel 50 is again in contact with the centre of disc 51.

What I claim is:

1. Perforating apparatus for perforating the elements of a signal combination, comprising, for each element a perforating punch, a relay having an associated armature adapted to assume either of two positions in response to different electrical conditions of its winding, a spring-held lever holding the armature of said relay in the position last assumed thereby, cam means for moving said lever in a direction against the tension of its spring to release said armature to enable said armature to take up a new position, said armature adapted in one of its positions to maintain said lever out of operative relation with said cam means, and means coupled to said lever for selectively operating said punch during the motion of said lever in the opposite direction, according to the new position assumed by said armature.

2. Perforating apparatus as claimed in claim 1, further comprising means for simultaneously operating said levers.

3. Perforating apparatus as claimed in claim 1 wherein said punches are linked directly to the said levers.

4. Perforating apparatus as claimed in claim 1, in which the relays for the respective elements of the signal combination are divided into two sections, and the cam means comprises two cam shafts which are simultaneously driven for operating the levers acting on the respective sections of relays.

5. Perforating apparatus as claimed in claim 1, in which said cam means comprises a multi humped cam for operating said levers a plurality of times during each cam rotation.

References Cited in the file of this patent

UNITED STATES PATENTS

| | | |
|---|---|---|
| 363,106 | Wynne | May 17, 1887 |
| 2,381,322 | Thomas | Aug. 7, 1945 |
| 2,398,014 | Lake | Apr. 9, 1946 |
| 2,585,720 | Anderson | Feb. 12, 1952 |
| 2,652,116 | Mallina et al. | Sept. 15, 1953 |
| 2,683,600 | Sigoda | July 13, 1954 |
| 2,723,117 | Clark | Nov. 8, 1955 |
| 2,737,241 | Doty | Mar. 6, 1956 |